United States Patent Office 3,438,931
Patented Apr. 15, 1969

3,438,931
PHENOLIC MOLDING COMPOSITIONS
Philip A. Mitchell, South Bound Brook, Carlo F. Martino, Somerville, and Lawrence G. Imhof, Westfield, N.J., assignors to Union Carbide Corporation, a corporation of New York
No Drawing. Filed Dec. 14, 1964, Ser. No. 418,298
Int. Cl. C08g 37/20
U.S. Cl. 260—38          6 Claims

ABSTRACT OF THE DISCLOSURE

A phenolic molding composition wherein a curable phenolic resin and from 0.7 to 17 parts by weight of a nonacidic ethylene/vinyl copolymer per hundred parts phenolic resin are intimately admixed, the ethylene/vinyl copolymer containing polymerized monomer of ethylene to vinyl comonomer of from 90:10 to 50:50.

---

The present invention relates to improved phenolic molding compositions which exhibit enhanced flow properties.

Phenolic resins have long been known and used in molding materials. The cure speed, rigidity, and other physical properties of these resins make them especially suitable for this type of application. However, it has been necessary to provide a wide range of flows in each composition in order to meet the combination of good flow and cure speed required by the wide variety of parts which are molded. The flow properties of these resins directly affect the molding cycle, the heating requirements for the resin and molding filling capabilities, and are therefore important considerations economically and functionally.

In order to lower cost and modify the properties of phenolic molding composition it has frequently been found desirable to incorporate various filler materials into the compositions. The use of these filler materials however, generally effects a detrimental change in the flow properties of the compositions. There has therefore existed for some time a need for a phenolic material which exhibits enhanced flow properties or improved molding latitude both in the absence and in the presence of filler materials.

While in the past various additives have been proposed to improve the flow properties of phenolic molding compositions, none of these proposed additives have achieved this improvement without resulting in excessive flashing or part porosity and adversely affecting other important properties such as cure speed, strength, rigidity and other like properties. Until the present time, no phenolic resin composition has been proposed which has exhibited sufficiently improved flow properties to make possible a reduction in the range of flows required for the wide range of parts which are molded.

In accordance with the present invention it has been found that phenolic molding compositions comprising:

(1) a curable phenolic resin and
(2) a non-acidic ethylene copolymer exhibit the desired latitude in flow properties without increasing the degree of flash or porosity during the molding of parts and in some cases with an improvement in impact strength. Thus, flow improvement has been measured by determining the sensitivity of flow to pressures and preform temperature changes and observing the porosity and degree flashing obtained in the molded part.

The curable phenolic resin component of the compositions of the present invention are the condensation products of a phenol with an aldehyde. Such condensation products are divided into two classes resoles and novolaks. These two types of resins are discussed in order below.

Resole resins

Resole resins are most frequently produced by the condensation of phenols and aldehydes under alkaline conditions. Resoles differ from novolaks in that polynucuear methylol-substituted phenols are formed as intermediates in resoles. A resole produced by the condensation of phenol with formaldehyde most likely proceeds through an intermediate having the following illustrated type structure:

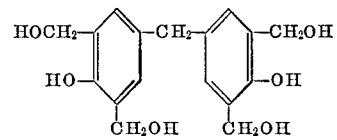

In a typical synthesis, resoles are prepared by heating one mole of phenol with 1.5 moles of formaldehyde under alkaline conditions.

The resole resins are prepared by the condensation of phenols with formaldehyde, or more generally, by the reaction of a phenolic compound, having two or three reactive aromatic ring hydrogen positions, with an aldehyde or aldehyde-liberating or engendering compound capable of undergoing phenol-aldehyde condensation. Illustrative of phenols are phenol, cresol, xylenol, alkyl phenols such as ethylphenol, butylphenol, nonylphenol, dodecylphenol, isopropylmethoxyphenol, chlorophenol, resorcinol, hydroquinone, naphthol, 2,2-bis(p-hydroxyphenyl)propane, and the like and mixtures of such phenols. Illustrative of aldehydes are formaldehyde, paraform, acetaldehyde, acrolein, crotonaldehyde, furfural, and the like. Illustrative of aldehyde-liberating compounds is 1,3,5-trioxane. Illustrative of the aldehyde engendering agents is hexamethylene tetramine. Ketones such as acetone are also capable of condensing with the phenolic compounds to form phenolic resins.

The condensation of a phenol and an aldehyde is conducted in the presence of alkaline reagents such as sodium carbonate, sodium acetate, sodium hydroxide, ammonium hydroxide, and the like. When the condensation reaction is completed, if desired, the water and other volatile materials can be removed by distillation, and the catalyst neutralized.

The resole resins are termed heat curable resins. That is, under the application of heat these resins progressively polymerize until they are finally insoluble, infusible and completely cured. For the purposes of the present invention the curable phenolic resins, are considered those which have not so advanced in polymerization that they have become infusible.

Novalak resins

The novalak resins are prepared in a manner similar to that used to prepare the resole resins. The distinguishing exception in this preparation is however that the reaction is normally conducted in an acidic media, instead of an alkaline media as is the case with the resoles. The phenolic compounds useful in their preparation as well as the aldehydes are the same as are useful in the preparation of resole resins. When less than six moles of formaldehyde are used per seven moles of phenol the products are permanently fusible and soluble. These are the novalak resins. The novalaks have a different structure than the resoles as is illustrated by the novolak condensation products of phenol with formaldehyde:

(a) 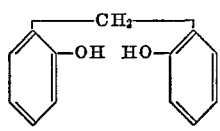

(b) 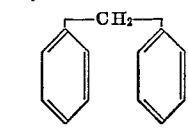

(c) 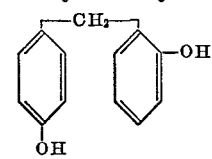

In a typical synthesis novolaks are prepared by heating one mole of phenol with 0.5 mole of formaldehyde under acidic conditions. The temperature at which the reaction is conducted is generally from about 25° C. to about 175° C.

The reactants which can be used in the preparation of the novolaks are the same as those used in the preparation of the resoles which are described and listed above.

While as previously stated both the resole resins and the novolak resins can be employed in the compositions of the present invention, it is preferred to use the novolak resins. Particularly preferred are the novolak resins prepared from formaldehyde and mixtures of phenol and up to 50 percent of an alkyl phenol wherein said alkyl substituent contains from 6 to 12 carbon atoms inclusive. Such resins produce cured products having excellent finishes.

It should be noted that the novolak resins are not heat curable per se. Novolak resins are cured in the presence of curing agents such as formaldehyde, hexamethylene tetramine, paraformaldehyde, ethylenediamine-formaldehyde, and the like.

Therefore, for the purposes of the present invention curable novolak resins are considered to be novolak resins in the presence of a suitable curing agent. Such curing agents are generally used in amounts of from 1 to 30 parts by weight per 100 parts of novolak resin. Curing is generally effected by heat.

Various amines such as urea, melamine and aniline and the like and their derivatives condense with aldehydes such as formaldehyde although the properties of these resins are different than those of the phenolic resins.

Phenolic molding resins prepared by condensing an aldehyde such as formaldehyde with a mixture of a phenol and up to 100 parts by weight of an amine such as urea, melamine or aniline per hundred parts phenol, provide highly desirable properties when used in molding compositions. These resins are commonly known as melamine phenolic resins, urea phenolic resins, aniline phenolic resins and the like depending on the modifying compound.

The amine-phenolic aldehyde resins such as the urea phenolic resins, the melamine phenolic resins, and the aniline phenolic resins can be used in the phenolic molding compositions of this invention and such resin compositions are intended to be included within the term "phenolic resins."

The term "non-acidic ethylene copolymers" is meant to include those polymers of an ethylene monomer copolymerized with 2 or more non-acidic copolymerizable monomers. The non-acidic copolymerizable type monomers are those containing the vinyl group,

which can be copolymerized with olefin monomers such as ethylene and propylene to form non-acidic thermoplastic copolymers. By definition herein the term "non-acidic" means that the polymer does not have pendant carboxylic acid groups such as are provided by the copolymerization of unsaturated carboxylic acids with olefin monomers. It is desirable that the olefin monomer component of the copolymer contains from 2 to 3 carbon atoms inclusive. Illustrative of the non-acidic copolymerizable monomers which can be used in the formation of the copolymers useful in the present invention are vinyl aryls such as styrene, o-methoxystyrene, p-methoxystyrene, m - methoxystyrene, o - nitrostyrene, m - nitrostyrene, o-methylstyrene, p-methylstyrene, m-methylstyrene, p-phenylstyrene, o-phenylstyrene, m-phenylstyrene, vinylnaphthalene and the like; vinyl and vinylidene halides such as vinyl chloride, vinylidene chloride, vinylidene bromide and the like; vinyl esters such as vinyl acetate, vinyl propionate, vinyl butyrate, vinyl chloroacetate, vinyl chloropropionate, vinyl benzoate, vinylchlorobenzoate, and the like; the alkyl esters, amides and nitriles of acrylic and alpha-alkyl acrylic acids, their amides and their nitriles such as methyl acrylate, ethyl acrylate, butyl acrylate, n-octyl, acrylate, 2-ethylhexyl acrylate, n-dodecyl acrylate, methyl methacrylate, butyl methacrylate, methyl ethacrylate, ethyl ethacrylate, acrylamide, N-methyl acrylamide, N,N-dimethylacrylamide, methacrylamide, N-methyl methacrylamide, N,N - dimethyl methacrylamide, acrylonitrile, chloroacrylonitrile, methacrylonitrile, ethacrylonitrile, and the like; alkyl esters of maleic and fumaric acid such as dimethyl maleate, diethyl maleate and the like; vinyl alkyl esters and ketones such as vinyl methyl ether, vinyl ethyl ether, vinyl isobutyl ether, 2-chloroethyl vinyl ether, methyl vinyl ketone, ethyl vinyl ketone, isobutyl vinyl ketone and the like; also vinyl pyridine, N-vinyl carbazole, N-vinyl pyrrolidone, ethyl methylene malonate and the like, propylene, isobutylene and the like. These ethylene/vinyl copolymer resins generally contain polymerized monomer of ethylene to vinyl comonomer of from 90:10 to 50:50 and preferably from 85:15 to 75:25.

While ethylene homopolymer can be used to some advantage in phenolic compositions the non-acidic ethylene copolymers have been found to provide flow properties heretofore unattainable, without detrimental effects on cure speed and appearance i.e., lack of porosity. It should be noted that the ethylene copolymer compositions are vastly superior to the compositions containing homopolymer when both cup closing time and product appearance is concerned. Individual non-acidic ethylene copolymers resins which have provided outstanding properties are ethylene/vinyl acetate copolymer and the ethylene/ethyl acrylate copolymer. These copolymers are for that reason preferred.

The non-acidic ethylene copolymer resins useful in the compositions of this invention are the thermoplastic ethylene copolymer resins which exhibit melt indices of from about .1 to about 1,000 decigrams per minute inclusive and more desirable of from about 0.5 to about 350 decigrams per minute inclusive.

The non-acidic ethylene polymer resins are generally used in the phenolic molding compositions of the present invention in amounts of from 0.15 to 67 parts by weight per hundred based on the weight of the phenolic resin. Preferably, a non-acidic olefin polymer is used in amounts of from 0.7 to 17 parts by weight per hundred parts phenolic resin by weight.

It should be noted that the curable phenolic resin compositions of this invention can, and generally do, have present additive compounds which are normally used in such compositions. These additives generally provide enhanced properties to the resin compositions and can serve to lower cost.

Illustrative additive compounds include lubricants such as the metal salts of long chain aliphatic acids such as the stearates as well as long chain aliphatic alcohols and acids; plasticizers such as furfuryl; cure accelerators such as lime, magnesium oxide, barium oxide, strontium oxide and the like; fillers such as barium sulfate, calcium sulfate, silica, fibrous asbestos, talc, calcium silicate, magnesium silicate, mica, soapstone, slate flour, pumice, wood flour, soy bean flour, tobacco flour, walnut shell flour, sulfur, tripolite, calcium oxide, magnesium oxide, calcite, diatomaceous earth, fuller's earth, alumite, calcium phosphate, magnesium phosphate, bauxite, chalk magnesite, kaolin clay, bentonite clay, ball clay, fire clay, dolomite, muscovite, paragonite, margarite, vermiculite, pyrophyllite, apatite, tricalcium phosphate, volcanic dust; pigments normally added to such compositions to impart color; and abrasive particles such as sand, flint, glass, garnet, corundum, silicon carbide, tungsten carbide and the like.

The filler materials are of particular importance because of the properties that they impart to the resin composition and because of the economic benefits that their use provides. The fillers are generally used in an amount of from about 5 to about 150 percent of the weight of the resinous components of the composition and preferably from about 25 to about 100 percent.

For convenience, typical ingredients of the compositions of this invention and the useful and preferred amounts are set forth in Table I below:

TABLE I

| | Useful weight percent | Preferred weight percent |
|---|---|---|
| Curable phenolic resin [1] | 25–65 | 30–50 |
| Basic earth | 0–5 | 1–3 |
| Colorants | 0–20 | 0–5 |
| Lubricants | 0–3 | 0.1–3 |
| Ethylene/vinyl copolymer | 0.1–20 | 0.5–5.0 |
| Fillers [2] | 0–60 | 35–45 |

[1] When the phenolic resin used is a novolak resin then generally from 5 to 15 percent and preferably 6 to 7 percent curing agent is added to the phenolic. Preferred curing agent is hexamethylenetetramine.
[2] Generally used but not necessary for some specialty products.

In the preparation of the composition of this invention conventional production techniques such as compounding on standard two roll mills or other conventional compounding devices such as Banbury mill, Screw compoundery, or Kneader can be used. The ethylene/vinyl copolymer can be introduced to the composition by at least three means. The first method is by addition of the thermoplastic to the raw mix prior to compounding. Secondly, it may be introduced directly into the still during the manufacture of the phenolic resin or finally it can be added in the form of a master-batch whereby the resin is compounded with the phenolic resin in an appropriate ratio and then added to the raw mix as required. Because of the ease of production the second method has been found preferable. It should be noted that the ethylene copolymer resin is blended at a temperature sufficiently high to flux the copolymer resin but for a period of time to effect blending without curing the composition when the copolymer resin is blended in situ during the condensation reaction during which the phenolic resin is formed, the condensation temperatures are generally sufficient to effect blending. Cure does not usually present a problem by this last method.

In Examples 1–9 below, unless otherwise indicated the following standard phenolic molding formulation was used to determine the effect of copolymer addition.

| Marterial: | Percent by weight |
|---|---|
| Phenolic resin | 41.0 |
| Hexamethylene tetramine | 6.0 |
| Calcium oxide | 1.5 |
| Carbon black | 0.6 |
| Nigrosine dye | 0.8 |
| Asbestos | 6.0 |
| Metal stearate | 1.0 |
| Wood flour | 39.1–x |
| Plasticizer [1] | 4.0 |
| Ethylene copolymer | x |

[1] Furfural absorbed on hydrated calcium silicate.

In each of the Examples 1–9 the compositions were compounded for a period of 75 seconds on a two roll mill in which the front roll had a temperature of 210° F. and the back roll had a temperature of 265° F.

The following tests were used to evaluate the resin compositions in the examples which follow.

Ball-drop impact test

The ball-drop impact test, used to determine strength differences, consists of dropping a 66.75 gram ball on a molded ASTM cup. The test is begun at a height of 6 inches and continued in two inch increments until the cup cracks and/or breaks. The resultant values have been reported in two ways.

A figure reported in inches is simply that height at which breakage and/or cracking occurred. This measurement does not take into account any of the energy input of preceding drops.

A figure reported in inch-lbs. is the total energy input necessary to cause cracking and/or breaking. It is the summation in energy units of all shots and is calculated according to the formula:

$$S = \frac{NW}{2}[2A + (N-1)D]$$

where:
$S$ = Work to break, inch-pounds
$N$ = Number of blows
$W$ = Weight of ball, pounds
$A$ = Height of first drop, inches
$D$ = Increment between blows, inches Izod impact test.—A.S.T.M. D256–56.

Cup closing time

This is a method for determining the molding index under specified conditions of stiff flow thermosetting molding compounds and is in conformance with A.S.T.M. D731–57 except that the pressure used to close the mold was 20 kilopounds and the time reported is the time required to close the mold at this pressure.

Minimum load to fill

This is a method for measuring the plasticity of thermosetting molding compounds in terms of the pressure required to fill a 2 inch cup mold as described in A.S.T.M. D731–57 to a flash thickness of 0.010 under specific mold conditions. Under this procedure three cups are molded at a given charge weight at three different mold loads so that one cup will have a flash thickness between 8 and 10 mils and the other two between 10 and 15 mils. The mold pressure and flash thickness are taken from gauge at 90 seconds after the pressure is applied to the material in the cup. A graph is then plotted to flash thickness versus molding pressure for each of the three cups and a straight line is drawn through the three points. Additional runs are made if necessary. The mold pressure required to mold a cup with a flash thickness of 10 mils is then read from the graph and reported.

Minimum blister free time

This is a method for determining the speed of cure of a thermosetting molding compound when molded under specified molding conditions. The mold used in this test is a steam heated, single cavity bottle cup mold, with recess set at 0.25 inch.

The mold is compressed at a pressure of about 12,000 pounds total load and a sample is molded for a specified charge weight and a 60 second molding time. If the molded specimen is blistered additional samples are molded increasing the molding time by 5 second increments, until three especimens are obtained which exhibit no visible blister. If no visible blister is observed at 60 seconds the molding time is decreased until two samples exhibiting blister have been molded. The minimum molding time at which a specimen was molded and was free of visible blisters is recorded as the "visible free blister time." One specimen is molded at three times the "visible free blister time." All specimens are allowed to cool and the thickness of the bottoms of all samples is measured. Blister height is measured as the difference in the visible blister samples and the 3× visible free blister time sample. A graph is prepared plotting the blister height versus the molding time for all specimens except the sample molded at 3 times the visible free blister time.

The molding time equivalent to a blister of five mils is determined from the graph and recorded as the "minimum free blister time."

EXAMPLE 1

A series of phenolic resin molding materials was prepared from the phenolic resin and ethylene copolymer described below:

Ethylene copolymer 1–1.—An ethylene-ethyl acrylate copolymer resin containing 18 percent ethyl acrylate and exhibiting a melt index of from 5 to 7 decigrams per minute.

Formulations of phenolic resin and ethylene copolymer were prepared utilizing 0, 0.5, 1.0, 3.0, 9.0 and 20.0 percent by weight ethylene copolymer based upon the total weight of the molding compound. The copolymer was added as a powder to the standard phenolic resin molding mix, described above prior to blending. The mixture was then compounded by milling on a two roll mill. After compounding the various formulations each was compression molded into A.S.T.M. cups which were then subjected to the ball drop test. Table II below shows the percent copolymer Ball Drop to break in inches, Ball Drop to break in inch pounds and A.S.T.M. cup closing time for each of the formulations.

TABLE II.—EFFECT OF ETHYLENE COPOLYMER ON IMPACT STRENGTH AND CUP CLOSING TIME OF HIGH 2,2'-NOVOLAK PHENOLIC MACHINE COMPOUND

| Ref. | Weight percent ethylene ethyl acrylate copolymer | Ball drop to break in inches | Ball drop to break in inch/lbs. | Mold closing time (seconds) at 20 kilopounds |
|---|---|---|---|---|
| Control | 0 | 28.4 | 31 | 7.3 |
| A | 0.5 | 28.4 | 31 | 4.1 |
| B | 1.0 | 33.5 | 42.5 | 2.8 |
| C | 3.0 | 31.3 | 37.0 | 2.3 |
| D | 9.0 | 32.4 | 40.0 | 1.7 |

EXAMPLE 2

In a manner similar to that described in Example 1 above a series of molding compounds was made utilizing the following resins.

Phenolic resins.—Acid catalyzed novolak resin prepared from phenol and formalin.
Ethylene copolymer 1–1.—Ethylene-ethyl acrylate copolymer resin containing 18 (by weight) percent ethyl acrylate and exhibiting a melt index of from 5 to 7 decigrams per minute.

Formulations were prepared containing 0, 1.0, 2.0 and 4.0 percent by weight ethylene copolymer based on the total weight of the molding compound.

These formulations were similarly molded into ASTM cups and tested for impact strength by the Ball Drop Test and the Izod Impact Test. The results of these evaluations are given in Table III below with the grade by Flow Tester Flow and the cup closing time.

TABLE III.—EFFECT OF ETHYLENE COPOLYMER ON IMPACT STRENGTH AND CUP CLOSING TIME OF LOW 2,2'-NOVOLAK PHENOLIC MOLDING COMPOUND

| Reference No. | Control | F | G | H |
|---|---|---|---|---|
| Percent ethylene copolymer | 0 | 1.0 | 2.0 | 4.0 |
| Ball-drop to break (inches) | 37 | 36 | 37 | 42 |
| Ball-drop to break (inch pound) | 53 | 50 | 53 | 66 |
| Cup closing time, secs. at 20 kilopounds | 6.8 | 2.8 | 2.5 | 2.2 |
| Grade by flow tester flow | 15 | 15 | 15 | 18 |
| Izod impact (foot pounds/inch of notch) | .33 | .32 | .34 | .33 |

EXAMPLE 3

Two molding compounds were prepared based on a high 2,2'-novolak resin containing one percent of one of the following ethylene copolymers:

3–1 Ethylene-vinyl acetate copolymer containing 25 percent vinyl acetate and exhibiting a melt index of 20 decigrams per minute.

3–2 Ethylene-vinyl acetate copolymer containing 28 percent vinyl acetate and exhibiting a melt index of 350 decigrams per minute.

These compounds were compression molded into test cups and thereafter evaluated for impact strength. Table IV below shows the results of those tests.

TABLE IV.—EVALUATION OF ETHYLENE-VINYL ACETATE COPOLYMER IN PHENOLIC RESIN MOLDING COMPOUNDS

| Additive | Ball drop to break in inches | Ball drop to break in inch pounds | Cup closing time in seconds at 20 kilopounds | Cure speed, MBFT [1] in seconds | Izod impact in foot pounds/inch of notch |
|---|---|---|---|---|---|
| Control | 29.6 | 33 | 5.1 | 53 | .28 |
| 1% copolymer 3–1 | 32 | 39 | 2.5 | 55 | .28 |
| 1% copolymer 3–2 | 29.2 | 32.5 | 3.6 | 55 | .28 |

[1] Minimum blister-free time.

EXAMPLE 4

A phenolic resin molding material was prepared using a high 2,2'-novolak resin containing one percent of the following ethylene copolymer resin:

Ethylene copolymer resin 4–1.—An ethylene-ethyl acrylate copolymer resin containing 26–33 percent ethyl acrylate and exhibiting a melt index of from 15 to 25 decigrams per minute.

A control molding compound was also prepared which was identical to the ethylene-copolymer modified composition except that the ethylene copolymer resin was deleted.

These molding compounds were molded into ASTM cups and evaluated. When compared to the control the modified molding composition exhibited a 33 percent greater ball drop impact based on inch pounds to break, a cup closing time of 2.5 seconds at 20 kilopounds compared to 5.0 seconds for the control and a cure speed as measured by the minimum blister free time, of 54 seconds as compared to 53 seconds for the control.

EXAMPLE 5

Two ethylene copolymers: ethylene/methyl acrylate as modifiers for phenolic molding compounds in the standard molding formulation. The phenolic resin was a high 2,2'-novolak made from phenol and formaldehyde. The ethylene copolymers had the following properties:

Ethylene copolymer 5–1.—Ethylene/methyl acrylate copolymer exhibiting a melt index of 3 decigrams per minute.

Ethylene copolymer 5–2.—Ethylene-acrylic acid copolymer containing 29% acrylic acid and exhibiting a melt index of 170 decigrams per minute.

The molding compounds were blended on a two roll mill, molded into A.S.T.M. test cups, and evaluated. The results were as follows:

|  | Ball, drop to break in inches | Ball drop to break in inch pounds | Cup closing time, sec. at 20 kilopounds |
|---|---|---|---|
| Control | 24 | 23 | 6.3 |
| 1% copolymer 5-1 | 30 | 34 | 2.6 |
| 1% copolymer 5-2 | 29 | 32 | 6.3 |

EXAMPLE 6

Two phenolic resin molding compositions were prepared in which the phenolic content was used at a 41 percent level and a 37 percent level. Controls (J and L) containing no ethylene copolymer were run for each. The molding compositions were mixed on a two roll mill, plunger molded into test cups, and evaluated. The composition of these formulations and their test properties is shown in Table V below. The phenolic resin used was a high 2,2'-novolak, phenol-formaldehyde resin.

TABLE V.—EFFECT OF REDUCED PHENOLIC RESIN CONTENT ON ETHYLENE COPOLYMER MODIFIED PHENOLIC MOLDING COMPOSITIONS AND UNMODIFIED CONTROLS

| Formulation (percent by wt.) | I | J | K | L |
|---|---|---|---|---|
| Material: |  |  |  |  |
| Phenolic resin | 41.0 | 41.0 | 37.0 | 37.0 |
| Hexamethylene tetramine | 6.0 | 6.0 | 6.0 | 6.0 |
| Calcium oxide | 1.5 | 1.5 | 1.5 | 1.5 |
| Nigrosine | 0.8 | 0.8 | 0.8 | 0.8 |
| Asbestos fibers | 6.0 | 6.0 | 6.0 | 6.0 |
| Metal stearate | 1.0 | 1.0 | 1.0 | 1.0 |
| Wood flour | 42.1 | 42.1 | 46.1 | 46.1 |
| Ethylene Copolymer [1] | 1.0 | 0 | 1.0 | 0 |
| Test properties based on grade by MLTF (minimum load to fill ASTM cup) | 9 | 9 | 9 | 2 |
| Flow tester flow, in./p.s.i. | 0.74/500 | 0.90/500 | 0.44/500 | 0.12/500 |
| Grade by FTF | 7 | 9 | 4 | 4 |
| Ball drop to break (inches) | 36 | 34 | 36 | 31 |
| Ball drop to break (inch-pounds) | 48 | 44 | 48 | 36 |
| Preheat temperature range to fill a circular piece at 1,000 p.s.i. and 1,800 p.s.i. plunger pressure, of (° F.) | 225-265 | No. fill | 230-268 | No fill |
| MLTF (corrected) | 7.9 | 7.7 | 7.0 | 22.0 |

[1] 18% ethyl acrylate copolymer with ethylene, 5 to 7 decigrams per minute melt index.

EXAMPLE 7

Four ethylene copolymers: two each of ethylene-acrylonitrile and ethylene-styrene were evaluated as modifiers for phenolic molding compounds in the standard molding formulation. The phenolic resin was a low 2,2'-novolak made from phenol and formaldehyde. The ethylene copolymers had the following properties.

Ethylene copolymer 7-1.—Ethylene acrylonitrile copolymer containing 9.7% acrylonitrile and exhibiting a melt index of 17 decigrams per minute.

Ethylene copolymer 7-2.—Ethylene acrylonitrile copolymer containing 17.5% acrylonitrile and exhibiting a melt index of 36 decigrams per minute.

Ethylene copolymer 7-3.—Ethylene styrene copolymer containing 9.7% styrene and exhibiting a melt index of 4.7 decigrams per minute.

Ethylene copolymer 7-4.—Ethylene styrene copolymer containing 17.0% styrene and exhibiting a melt index of 30 decigrams per minute.

The molding compounds were blended and then fluxed on a two roll mill, molded into A.S.T.M. cups, and evaluated. The results were as follows:

|  | Mold closing time (seconds) |
|---|---|
| Control | 8.0 |
| Copolymer 7-1, 1% (by weight of total composition) | 4.0 |
| Copolymer 7-2, 1% | 3.9 |
| Copolymer 7-3, 1% | 4.0 |
| Copolymer 7-4, 1% | 4.8 |

EXAMPLE 8

Novolak phenolic compositions were prepared containing various additives as shown in Table V below. The formulation and compounding conditions are given below. All thermoplastic concentrations, other than 1% have been compensated for by adjusting the wood flour content. The formulation used to prepare the compositions 8-1—8-10 was the standard formulation given above.

The control 8-0 was prepared utilizing the same formulation but with wood flour substituted for the thermoplastic resin additive.

The formulation was compounded on a roll mill for a period of 75 seconds. The front roll had a temperature of 210° F. and the back roll was set at a temperature of 265° F.

The tests results and thermoplastic resin additives are shown in Table VI below.

TABLE VI

| Additive | No. | Percent by weight addition | Percent phenolic | Ball drop to break (inches) | Ball drop to break (inch pounds) | Cup closing time, sec. at 20 kilopounds | Cure speed at 335° F. (seconds) | Comments |
|---|---|---|---|---|---|---|---|---|
| Control | 8-0 | 0 | 41 | 28 | 31 | 7.8 | 53 |  |
| (Ethylene-ethyl acrylate) | 8-1 | 1 | 41 | 33.5 | 42.5 | 2.5 | 55 |  |
| Vinyl (acetate/chloride) copolymer | 8-2 | 5 | 41 | 31 | 37 | 6.8 | 58 | No improvement to C.C.T.[3] |
| Polyvinyl acetate | 8-3 | 1 | 41 | 26.8 | 27.5 | 8.4 |  | Do.[3] |
| Do | 8-4 | 5 | 41 | 35 | 47 | 7.0 | 59 |  |
| Do | 8-5 | 9 | 41 | 32 | 39 | 9.4 |  |  |
| Polyethylene [1] | 8-6 | 5 | 41 | 30 | 34 | 1.9 |  | Blistered piece. |
| Acrylonitrile-buta-diene rubber | 8-7 | 5 | 41 | 30 | 34 | 6.7 | 69 | Do. |
| Butyl rubber | 8-8 | 5 | 41 | 33 | 42 | 1.7 | 76 | 22 second slower cure. |
| Ethylene-propylene rubber | 8-9 | 5 | 41 | 27 | 28 | 1.2 | 77 | 23 second slower cure. |
| Polybutadiene | 8-10 | 5 | 41 | 28 | 30 | 1.1 | 74 | 20 second slower cure. |
| Polypropylene [2] | 8-11 | 5 | 41 |  |  | 10.1 |  | Unfused thermoplastic. |

[1] Density 0.914 M.I. n6.  [2] Having a M.I. of 4.  [3] Cup closing time.

EXAMPLE 9

A phenolic resin molding material was prepared using a low 2,2'-novolak resin. The resin was made by replacing 10 parts of phenol with 10 parts by weight para nonyl phenol such that the charge to the still consisted of a 9 to 1 ratio of phenol/para nonyl phenol.

The resulting resin was modified with 2.2 parts per hundred of Ethylene Copolymer Resin 1-1 and compounded into the standard formulation.

The molding material was molded into A.S.T.M. cups. The mold closing time was 3.1 secs for the modified alkyl phenol resin versus 8.8 seconds for the control.

In a similar manner resole phenolic molding compositions are prepared except that it is not necessary to add hexamethylene tetramine or other curing agent although this ingredient may be present. The results are substantially the same.

What is claimed is:

1. A phenolic molding composition comprising in intimate admixture a curable phenolic resin and from 0.7 to 17 parts by weight of a non-acidic ethylene/vinyl copolymer per hundred parts phenolic resin said ethylene/vinyl copolymer containing a polymerized monomer of ethylene to vinyl comonomer of from 90:10 to 50:50.

2. The phenolic molding composition of claim 1 wherein said non-acidic ethylene/vinyl copolymer is ethylene/vinyl acetate copolymer.

3. The phenolic molding composition of claim 1 wherein said non-acidic ethylene/vinyl copolymer is ethylene/ethyl acrylate copolymer.

4. The phenolic molding composition of claim 1 wherein said non-acidic ethylene/vinyl copolymer is ethylene/styrene copolymer.

5. The phenolic molding composition of claim 1 wherein a filler material is present in an amount of from about 25 to about 100 percent by weight.

6. A method of imparting improved flow properties to phenolic resin molding composition comprising blending from about 0.15 to 67 parts by weight per hundred parts phenolic resin of an ethylene/vinyl copolymer resin with the phenolic resin composition during the condensation reaction through which the phenolic resin is formed at a temperature sufficiently high to flux the copolymer resin for a period of time sufficient to blend the fluxed copolymer resin with the phenolic resin composition without curing said composition said ethylene/vinyl copolymer containing polymerized monomer of ethylene to vinyl comonomer of from 90:10 to 50:50.

References Cited

UNITED STATES PATENTS

| | | | |
|---|---|---|---|
| 3,211,804 | 10/1965 | Baum et al. | 260—848 |
| 3,256,368 | 6/1966 | Soldatos et al. | 260—848 |
| 3,234,176 | 2/1966 | Bata et al. | 260—38 |

FOREIGN PATENTS

| | | |
|---|---|---|
| 501,270 | 4/1954 | Canada. |
| 561,639 | 8/1958 | Canada. |

MORRIS LIEBMAN, *Primary Examiner.*

L. T. JACOBS, *Assistant Examiner.*

U.S. Cl. X.R.

260—844, 847, 848